May 28, 1946.　　　A. L. ARMENTROUT　　　2,400,967
CONTROL SYSTEM
Filed Sept. 23, 1942　　　2 Sheets-Sheet 1

May 28, 1946.　　A. L. ARMENTROUT　　2,400,967
CONTROL SYSTEM
Filed Sept. 23, 1942　　2 Sheets-Sheet 2

Inventor
Arthur L. Armentrout
by
Attorney

Patented May 28, 1946

2,400,967

UNITED STATES PATENT OFFICE 2,400,967

CONTROL SYSTEM

Arthur L. Armentrout, Long Beach, Calif.

Application September 23, 1942, Serial No. 459,412

11 Claims. (Cl. 60—97)

This invention has to do with a control system and relates more particularly to a system of controlling and operating a plurality of units, as for example, a plurality of engines, electrical generators, or other like units. There are numerous situations in which it is desired to control or regulate a plurality of individual units. For example in aircraft and in boats it is common to have a number of engines requiring regulation and control. There are also situations in which a number of electrical generators are involved requiring control and regulation.

It is a general object of this invention to provide a control system whereby a plurality of units, as for example, engines, generators, or the like, which are individually regulable, are connected to operate in synchronism.

Another object of this invention is to provide a control system for connecting a plurality of units to operate in synchronism, which system contemplates establishing one of the units as the master unit from which the several other units are controlled. By the present invention I provide a selective control system which makes it possible to select any one of the several units as the master unit from which the others are controlled.

It is another object of this invention to provide a system of the character referred to in which the speed of synchronous operation of the several units can be regulated at will. In accordance with the present invention provision is made for regulation of the speed of the master unit which controls the speed of operation of all of the units.

Another object of the invention is to provide a selective control for the units whereby one or more of the units may be speeded up or slowed down with reference to the other units. By the present invention a group of several units, say for instance, four units, can be divided into two banks either one of which may be varied with reference to the other.

A further object of the present invention is to provide a system of the character referred to in which the several units of any one bank are operated in synchronism. The invention provides for the selection of one of the several units of a bank as the master unit which establishes the speed for all of the units of that bank.

Figure 1:
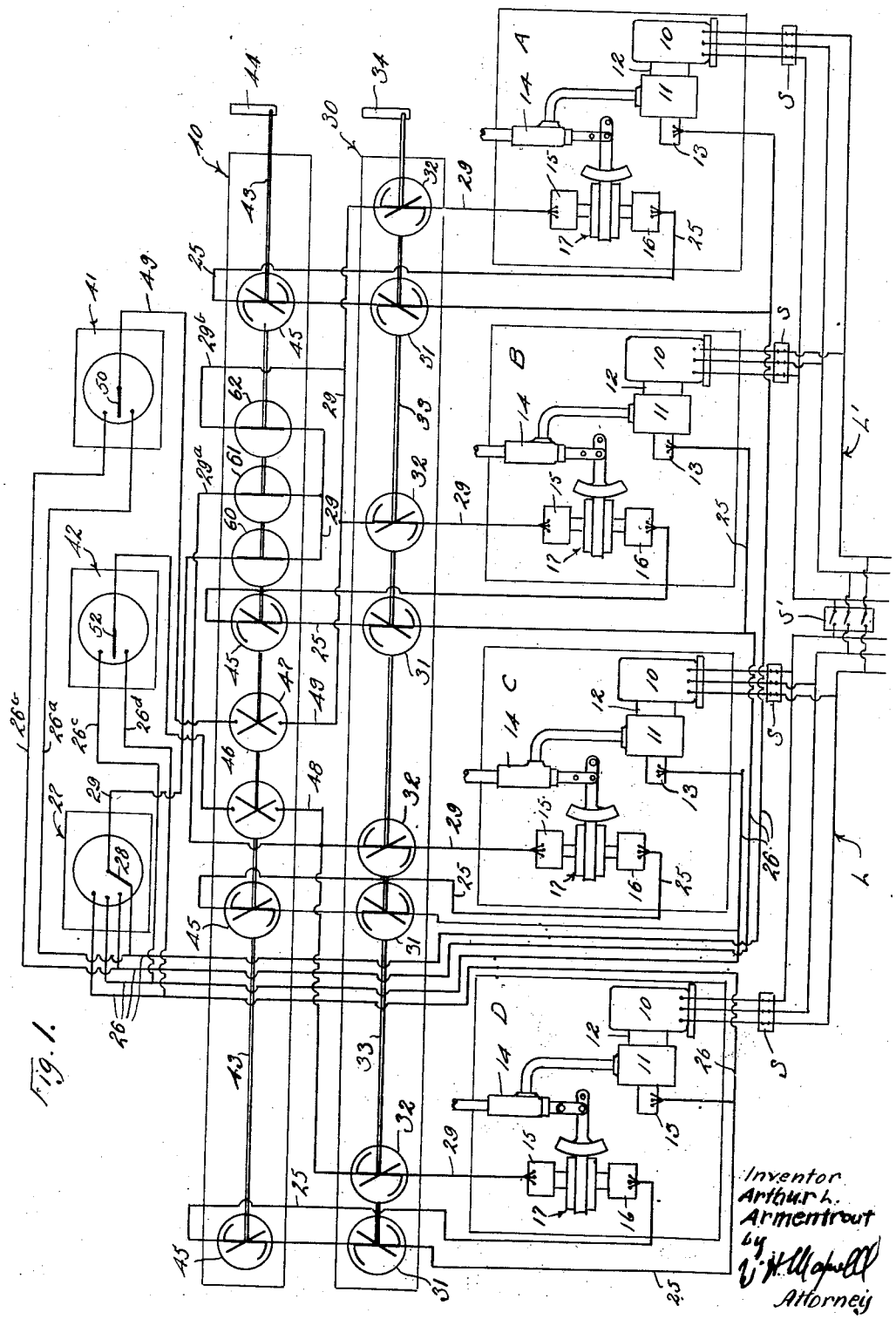
Figure 2:
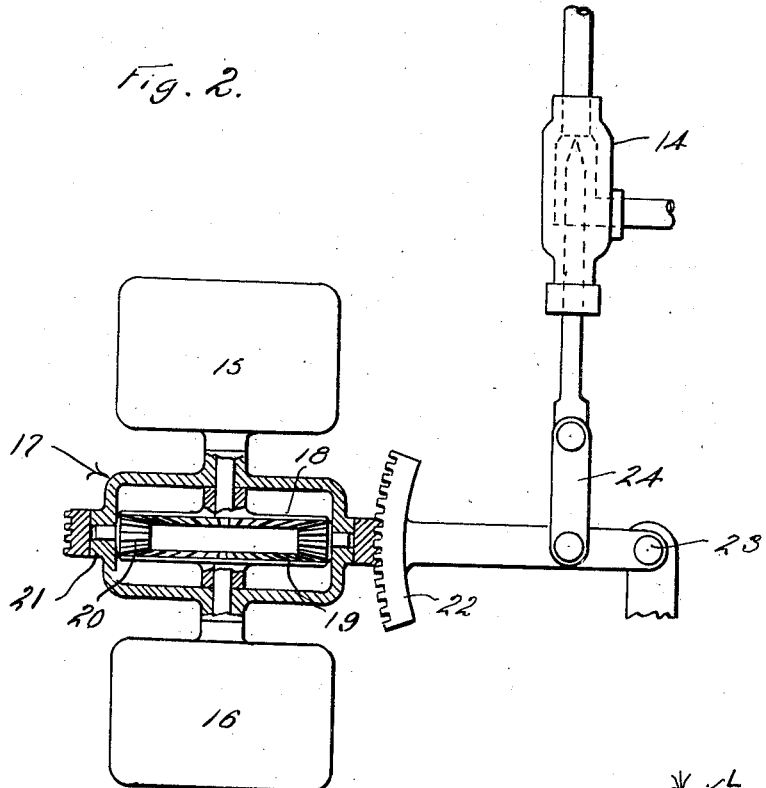
Figure 3:
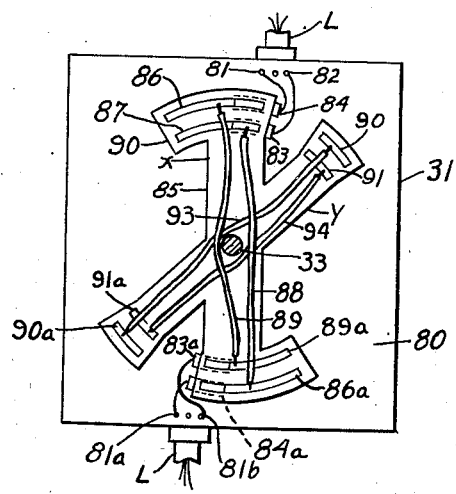

The various objects and features of my invention will be best and more fully understood from the following detailed description of a typical form and application of the invention, throughout which description I refer to the accompanying drawings, in which:

Fig. 1 is a diagrammatic view illustrating the system of the invention; Fig. 2 is an enlarged detailed fragmentary view illustrating parts of one of the units of the system, some parts being shown in section; and Fig. 3 is a view showing a switch construction such as may be used in carrying out the invention.

This invention contemplates, generally, the control and regulation of a plurality of units by which the units are made to operate in synchronism or in a predetermined relationship one to the other. The invention is applicable, generally, to various forms or types of units requiring control and regulation. For example, it may be employed advantageously for the control of engines such, for example, as the several engines of an aircraft, or it may be applied to the regulation of electrical generating units. In the example illustrated the units are electrical generating units operated by fluid pressure motors and the control or regulation of the units is effected through throttling of the fluid supply to the motors. I wish it understood, however, that when I refer to a unit subject to regulation that I contemplate various devices as units being controlled, and I do not wish the invention understood as limited or restricted to the particular type or form of unit illustrated. The invention may be used to advantage to synchronize internal combustion engines in which case the throttle of the engines may be operated by the control system.

In the example of the invention illustrated in the drawings there are four like units A, B, C and D subject to regulation and control. Each unit as illustrated includes, generally, an alternating current power generator 10, a fluid motor 11 for driving the power generator 10, an overrunning clutch 12 driving the power generator 10 from the motor 11, a control generator 13 driven by the motor 11, and a throttle valve 14 controlling the flow of operating fluid to the motor 11.

The several power generators 10 may be used to energize individual circuits or they may be connected together as circumstances require. In the case illustrated the generators 10 are three-phase alternating current generators and the output from the generators 10 of units D and C is connected with a common power line L to form what I will term the left bank of units while the generators 10 of units B and A are connected to a common power line L' forming what I will term the right bank of units. The several units are divided into banks for purposes hereinafter described. However, it will be obvious that all of the generators may be connected together to a common power line in which case they would form a single bank. Further, the output from each generator 10 may be under control of a switch S so the units can be individually cut out of the system if desired. A switch S' may be provided for connecting the two banks together.

As a part of the control provided by the present invention each unit includes an alternating current generator 13 driven by the motor 11, a pair of alternating current synchronous motors 15 and 16 operatively connected with the throttle valve 14 of the unit through a differential mechanism 17.

The elements just described and which are best illustrated in Fig. 2 of the drawings are so arranged that one pinion 18 of the differential mechanism is driven by motor 15 while the other pinion 19 is driven by motor 16. The pinions 18 and 19 are connected by planetary gears 20 carried by a planetary ring 21. With this arrangement if the alternating current motors 15 and 16 are operating in opposite directions and at the same speed all of the motion is taken up in the planetary gears 20 so that the planetary ring remains stationary. However, should the speeds of one of the synchronous motors vary relative to the other there will be motion of the planetary ring in one direction or the other, depending upon which of the motors is running fastest. In accordance with the invention the throttle valve 14 is operated through differential in the speed or direction of operation of the two motors 15 and 16. The operative connection is made by providing the planetary ring 21 with teeth so that it forms a worm gear that meshes with a worm segment 22 having a pivotal axis 23. A link 24 connects the segment 22 with the stem of the throttle valve.

The control system provided by the present invention for operating the several units in synchronism is an alternating current system which functions so that the alternating current control generator 13 of the unit selected as the master effects control of all of the other units. The control circuit is preferably a three-phase circuit. For sake of simplicity in the drawings I have illustrated a simplified wiring diagram in which the several lines necessary for carrying the three-phase circuit are represented by a single line. It will be understood of course that in practice there will be a multiplicity of conductors and connections necessary for handling a three-phase alternating current circuit.

In accordance with the present invention a line 25 connects the control generator 13 of each unit with the synchronous motor 16 of that unit, while a line 26 connects the control generator with a terminal of a master selector switch 27. The control element 28 of the selector switch is connected to the motors 15 of the several units by a connection 29. The control member 28 of the master selector switch 27 is operable to engage but one terminal connected with a control generator at a time. However, it is operable to connect with the terminal of any of the units that the operator may desire. For instance, in the drawings the control member 28 is shown in engagement with the terminal of unit A, that is, the terminal of the switch 27 which is connected with the generator 13 of unit A.

With the arrangement thus far described the output from the control generator of each unit is fed to the motor 16 of that unit so that the motor 16, being a synchronous motor, operates at the same speed as the generator 13. If the several units are all operating at exactly the same speed the motors 16 will all operate at the same speed. However, there may be variations in the speed of operation of the several units. The output of the selected control generator 13 being the generator 13 of unit A, is carried by the line 26 from the generator 13 of unit A to the master selector switch 27 where it is distributed by connection 29 to the motors 15 of the several units. Through this latter connection, that is, through the connection from the selected control generator 13 all of the motors 15 of the units are operated at exactly the same speed, namely, the speed at which the selected control generator is operating. This particular speed will, of course, be exactly the same as that at which the motor 16 of unit A is operating, since the generator 13 of unit A is connected with the motor 16 of that unit by the connection 25.

If there is any variation in speed of the synchronous motors 15 and 16 of any one of the other units that differential in speed will operate the differential mechanism of that unit which, in turn, will operate the throttle of that unit through the connection above described, causing the unit to speed up or slow down, depending upon which motor is operating faster than the others. The relationship of parts is such that the operation of the throttle brings about an adjustment in the operation of the unit so that its motor 11 comes to the speed of the motor 11 of the selected unit A. From the foregoing description it will be apparent that the selected unit A will operate constantly under a given load at whatever speed it has been set to operate, while the other units will be automatically adjusted to the unit A.

It may be desired, in practice, to speed up or slow down the operation of the entire system. To accomplish this the present invention provides a speed control means 30 which includes a pair of reversing switches in connection with each of the units. Each pair of reversing switches includes a reversing switch 31 in the connection 25 from the control generator to the motor 16 and a reversing switch 32 in the connection 29 from the master selector switch 27 to the motor 15.

In the drawings the two reversing switches 31 and 32 of each unit are shown operable by a common control shaft 33. In fact a common control shaft is shown in the means 30 carrying the reversing switches of all of the units so that a single operating lever 34 of the means 30 on the shaft 33 thereof will simultaneously operate all of the reversing switches of the means 30.

The reversing switches 31 and 32 are designed and related so that when the control lever 34 of the means 30 is thrown in one direction, for instance, to the left, the switch 31 reverses while the switch 32 continues to pass current without reversal, whereas if the lever 34 is thrown to the right the opposite is true, that is, the switch 32 will reverse, whereas the switch 31 will continue to operate without reversal.

My invention is in no way concerned with the details of elements such as the switches occurring in the system. In Fig. 3 I show an example of a mechanism that may be employed for reversing switches such as switches 31.

In Fig. 3 there is illustrated a switch 31 operable by the shaft 33 so that when the shaft is turned to the left the switch reverses but if the shaft is turned to the right the switch continues to function without change. The switch may involve a panel 80 to which the line L to be controlled is connected. Wires of the line L are connected to posts 81 and 82 at one side of the panel and posts 81ᵃ and 81ᵇ at the other side of the panel. The posts 81 and 82 are connected to fixed contacts 84 and 83, respectively, while the posts 81ᵃ and 81ᵇ are connected to fixed contacts 84ᵃ and 83ᵃ, respectively. The movable element of the switch may comprise a cross-like body 85 of insulating material having a cross-arm X and a cross-arm Y. Contacts 86 and 87 are carried at one end of arm X to cooperate with contacts 84 and 83, respectively. Contacts 86ᵃ and 89ᵃ are carried at the other end of the arm X to cooperate with contacts 84ᵃ and 83ᵃ, respectively. An electrical connection 88 is provided between contacts 87 and 86ᵃ and an electrical connection 89 is provided between the contacts 86 and 89ᵃ. The contacts 86 and 87 and 86ᵃ and 89ᵃ are of considerable length in the direction of movement of body 85 and extensions 90 are provided on the ends of the arm X to accommodate the contacts. Contacts 90 and 91 are provided on one end of arm Y and corresponding contacts 90ᵃ and 91ᵃ are provided on the opposite end of arm Y. An electrical connection 93 is provided between contacts 90 and 90ᵃ and an electrical connection 94 is provided between contacts 91 and 91ᵃ.

With a construction of the general type or character just described when the rotating element of the switch is in the position shown in Fig. 3, post 81 is connected with post 81ᵇ, while post 82 is connected with post 81ᵃ, and this relationship will continue throughout considerable movement of the switch part 85 to the right. The connection will be reversed, however, if the switch element 85 is moved a suitable amount to the left. Upon moving the switch element 85 to the left contacts 90 and 90ᵃ will be brought into contact with contacts 84 and 84ᵃ thus connecting posts 81 and 81ᵃ while contacts 91 and 91ᵃ will contact contacts 83 and 83ᵃ thus connecting posts 82 and 81ᵇ. This latter arrangement effects a reversal of the connection that is illustrated in Fig. 3.

It is to be understood that when I refer to operation of the control to effect reversal of the motors I do not necessarily mean that the motors literally stop and change direction, but rather it may be that the control is only operated momentarily so that the current is reversed in the motors causing but slight reduction of speed and not continuing long enough to reverse the direction of motion. Slight or momentary reduction of speed will effect a slight or limited change in speed of the units that are controlled.

With the arrangement of reversing switches above described it will be immediately apparent that the motor 15 or the motor 16 of a unit can be reversed at will, depending upon the direction in which the control lever 34 of means 30 is operated. If the lever 34 is operated to the left, that is to rotate the shaft 33 to the left, switch 31 will reverse causing reversal of motor 16, while the switch 32 will remain without reversal leaving the motor 15 operating in its original direction. With the direction of rotation of motor 16 reversed the differential mechanism is set in operation causing the planetary ring 21 to revolve which in turn causes the throttle valve of the unit to be operated. Whether the valve is opened or closed will depend upon which of the motors is reversed.

With the arrangement illustrated, that is, with all of the reversing switches of the means 30 on the common shaft 33 under control of a single lever 34, operation of the lever 34 effects simultaneous and like speeding up or slowing down of all of the units.

Where the several units of the system are divided into banks, as for instance into a left bank and a right bank, as hereinabove described, it may be desired to effect a differential in operation of the two banks, for instance, it may be desired to speed up one bank relative to the other, or it may be desired to speed up one bank while the other bank is correspondingly slowed down. As an example of such operation it may be considered that the power lines L and L', energized from the units as above described, are connected to propelling motors driving a ship, the line L energizing the lefthand motor and the line L' energizing the righthand motor. To maneuver the ship it may be desired to speed up one of the propelling motors while the other is being slowed down.

To effect the operation just referred to the present invention provides a turning control means 40 and in its preferred form it also provides selector switches 41 and 42 by which one of the units of each bank can be selected as the master unit with reference to which the other unit or units of the bank are synchronized. In the arrangement illustrated the selector switch 41 controls the selection of the right bank, that is for units A and B, while the selector switch 42 controls the left bank, or units C and D.

The turning control means 40 in the form illustrated in the drawings includes a series of switches on a common operating shaft 43 under control of an operating lever 44. The switches of the means 40 function to reverse the motors 15 of one bank while the motors 16 of the other bank are reversed and they serve to disconnect or separate the two banks of units so that they are independent of each other insofar as the control system is concerned. In the drawings the means 40 is shown to include a reversing switch 45 in the connection 25 of each unit, that is the means 40 provides a reversing switch between the generator 13 and the motor 16 of each unit. The reversing switches 45 of one bank are set opposite to those of the other bank, that is, the reversing switches 45 of the units of the left bank are such that when the control lever 44 is thrown to the left the switches do not reverse but continue to operate normally, whereas the switches 45 of the right bank reverse causing the motors 16 of the right bank to reverse. When the lever 44 is thrown to the right the opposite is true, that is, the switches 45 of the left bank reverse, whereas the switches 45 of the right bank continue operation without reversal in which case the motors 16 of the left bank are reversed. Through the switches 45 the motors 16 of one of the banks of units are reversed whenever the lever 44 is operated in either direction from the neutral position.

The means 40 includes a reversing switch 46 in a line 48 connecting switch 42 and the branch of line 29 leading to the motors 15 of the left bank, and a reversing switch 47 in a line 49 connecting switch 41 and the branch of line 29 leading to the motors 15 of the right bank. The switches 46 and 47 are normally in a neutral or disconnected position. These switches are operated by the common operating shaft 43 but are set to operate oppositely and so that when the lever 44 is thrown to the left both switches are engaged, one of them serving to pass the current to its bank without reversal while the other reverses the current. For example, switch 46 may pass the current unreversed while switch 47 effects a reversal thereof. When the lever 44 is thrown in the opposite direction or to the right the switches operate oppositely, that is, switch 46 serves to reverse the current whereas switch 47 makes connection without reversal. The switches 46 and 47 are related to the switches 45 so that when the motors 16 of the left bank are reversed by switches 45 the motors 15 of the right bank are reversed by the switch 47, whereas when the motors 16 of the right bank are reversed by switches 45 the motors 15 of the left bank are reversed by switch 46.

The selector switches 41 and 42 are fed from the lines 26 from the control generators of the several units. Extensions 26a and 26b extend from the lines 26 from units A and B respectively to terminals of the switch 41. The control member 50 of the switch 41 can be engaged with either of the terminals to connect whichever one is desired with the line 49 controlled by switch 47. Through the connection just described the control generator of either unit A or B may be selected by means of switch 41 as the source of energizing the motors 15 of units A and B, the unit selected becoming the control unit to which the other unit of the bank is regulated to synchronize.

Branches 26c and 26d from the lines 26 connected with the generators 13 of units C and D, respectively, connect with terminals of selector switch 42. The control member 52 of the switch 42 may be engaged with either terminal to connect at either line 48 controlled by switch 46. Through this connection the synchronous control of the units forming the left bank may be selected as hereinabove described with reference to the right bank.

When the units are being operated in banks, as just described it is necessary that the control connections to the two banks be disconnected so that controlling current reaches the banks only through the selector switches 41 and 42 and not through selector switch 27. For the purpose of separating the banks a disconnect switch 60 is provided to open the line 29 leading from the master selector switch 27. A disconnect switch 61 is provided in the portion 29a of line 29 which extends from switch 60 to the point where line 48 connects the line 29. A disconnect switch 62 is provided in the section 29b of line 29 leading from the switch 61 to the right bank. The cut-out switches 60, 61 and 62 are all operated by the control shaft 43 of means 40 and are all set so that they are closed when the system is operating through the master selector switch 27. When the operating lever 44 of means 40 is thrown in either direction the switches 60, 61 and 62 all open so that the two banks of units are disconnected insofar as their control through the master selector switch 27 is concerned.

In practice the speed control means 30 is normally employed merely for the purpose of varying the speed of the unit set or selected as the master unit with reference to which all the other units are synchronized. When the means 40 is operated to divide the units into two banks, a left bank and a right bank, one of these banks will immediately accelerate in speed while the other decelerates, depending upon the direction in which the lever 44 is thrown. If it is desired to accelerate or decelerate only one bank, leaving the other operating under normal conditions, control lever 34 of the means 30 may be operated simultaneously with the control 44 of means 40 so that the motors 15 of one bank are reversed to neutralize the effect of the control through the means 40 insofar as the motors of that bank are concerned.

It will be obvious that in carrying out the invention various indicators may be employed in connection with various parts of the system, for instance, it may be desirable in some installations to provide an instrument panel at a suitable point, for instance in the vicinity of the control members of the control system, and such panel may include various indicating instruments, such as tachometers for indicating the speeds of the various units, indicators for showing the positions of the throttles of the various units, and various electrical instruments showing the condition of the various parts of the electrical system. In the case of a system applied to the several engines of an aircraft it will generally be desired to provide tachometers in connection with the several mechanisms controlled and also to provide indicators to show the throttle positions, in order that the operator may know what power is available.

It will be understood, of course, that various forms or types of synchronous motors or electrical units may be employed in carrying out the invention. For example in some cases it may be desirable to use self synchronous apparatus such as is commonly known under the trade name of Selsyn. Such apparatus involves a transmitter corresponding to a generator 13 above described and a receiver corresponding to a synchronous motor such as either motor 15 or 16. When this type of apparatus is used it is necessary to provide an energizing unit not involved in the arrangement I have described in detail.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A system for synchronizing two independently operating units including, an alternating current generator driven by each unit, a control member for each unit, a differential control for operating each control member including a differential gear mechanism connected with the control member and a pair of synchronous motors one driving one pinion of the mechanism and the other driving the other pinion of the mechanism and electrical connecting means whereby the two motors of the control for one unit are energized by the generator of that unit while that generator also energizes one motor of the control for the other unit, while the other motor of the last mentioned control is energized by the generator of said other unit, the connecting means including means for reversing the current supplied to one of the motors.

2. A system for synchronizing two independently operating units including, an alternating current generator driven by each unit, a control member for each unit, a differential control for operating each control member including a differential gear mechanism connected with the control member and a pair of synchronous motors, one driving one pinion of the mechanism and the other driving the other pinion of the mechanism, and electrical connecting means whereby the two motors of the control for one unit are energized by the generator of that unit while that generator also energizes one motor of the control for the other unit, while the other motor of the last mentioned control is energized by the generator of said other unit, the connecting means including current reversing means whereby the current supplied to the motors controlling the first mentioned unit may be reversed to vary the speed of the first mentioned unit.

3. A system for synchronizing two independently operating units including, an alternating current generator driven by each unit, a control member for each unit, a differential control for operating each control member including a differential gear mechanism connected with the control member and a pair of synchronous motors, one driving one pinion of the mechanism and the other driving the other pinion of the mechanism, and electrical connecting means whereby the two motors of the control for one unit are energized by the generator of that unit while that generator also energizes one motor of the control for the other unit, while the other motor of the last mentioned control is energized by the generator of said other unit, the connecting means including a reversing switch in connection with each motor.

4. A system for synchronizing two independently operating units including, an alternating current generator driven by each unit, a control member for each unit, a differential control for operating each control member including a differential gear mechanism connected with the control member and a pair of synchronous motors, one driving one pinion of the mechanism and the other driving the other pinion of the mechanism, and electrical connecting means whereby the two motors of the control for one unit are energized by the generator of that unit while that generator also energizes one motor of the control for the other unit, while the other motor of the last mentioned control is energized by the generator of said other unit, the connecting means including a reversing switch in connection with each motor, and means connecting the reversing switches for each pair of motors so that either one of the motors can be reversed independently of the other.

5. A system for controlling a plurality of independently operating units including an interconnection between the units for synchronizing the operation of the several units to one unit selected as a master unit, and means for dividing the units into two independent banks each including a plurality of units synchronized to one unit selected as a master unit.

6. A system for controlling a plurality of independently operating units including an interconnection between the units for synchronizing the operation of the several units to one unit selected as a master unit, and means for dividing the units into two independent banks each including a plurality of units synchronized to one unit selected as a master unit, and including a speed control whereby a difference in speed obtains between the units of the two banks.

7. A system for controlling a plurality of independently operating units including an interconnection between the units including a means for selecting one unit as a master unit to which the other units are synchronized and means for controlling the speed of operation of the master unit, and a means for dividing the units into two banks each having a master unit to which the other units of the bank are synchronized.

8. A system for controlling a plurality of independently operating units including an interconnection between the units including a means for selecting one unit as a master unit to which the other units are synchronized and means for controlling the speed of operation of the master unit, and a means for dividing the units into two banks, including a speed control by which either bank can be selected to operate faster than the other.

9. A system for controlling a plurality of independently operating units including an interconnection between the units including a means for selecting one unit as a master unit to which the other units are synchronized and means for controlling the speed of operation of the master unit, and a means for dividing the units into two banks, including a speed control by which either bank can be selected to operate faster than the other, and a synchronizing control whereby any unit of a bank can be selected as the master unit of that bank to which the other units are synchronized.

10. A system for controlling a plurality of independently operating units including an electrical interconnection between the units including a means for selecting one unit as a master unit to which the other units are synchronized and means for controlling the speed of operation of the master unit, and a means for dividing the units into two banks each having a master unit to which the other units of the bank are synchronized.

11. A system for controlling a plurality of independently operating units including an interconnection between the units including a means for selecting one unit as a master unit to which the other units are synchronized and means for controlling the speed of operation of the master unit, and an electrical circuit for dividing the units into two banks each having a master unit to which the other units of the bank are synchronized.

ARTHUR L. ARMENTROUT.